J. SHRADER.
Animal-Trap.
No. 201,293.  Patented March 12, 1878.
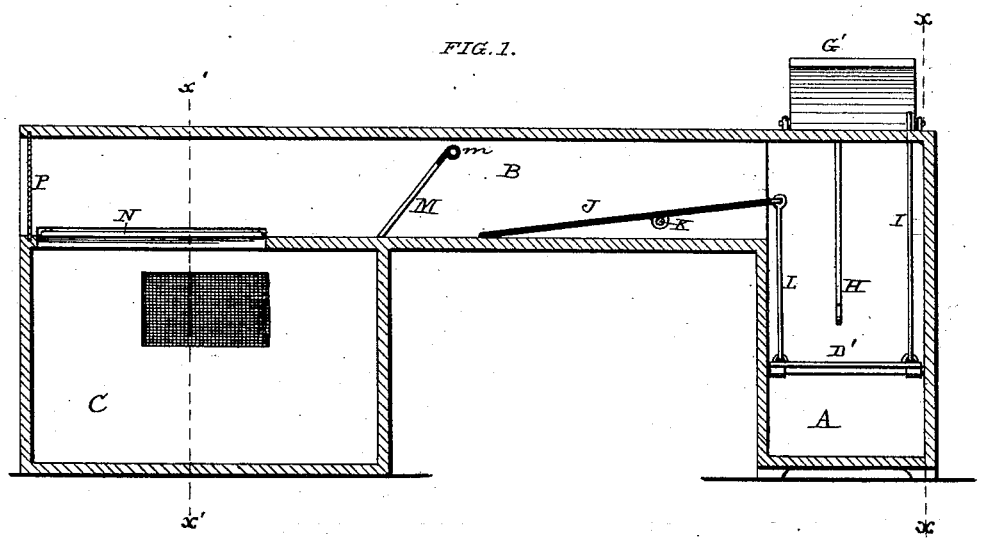
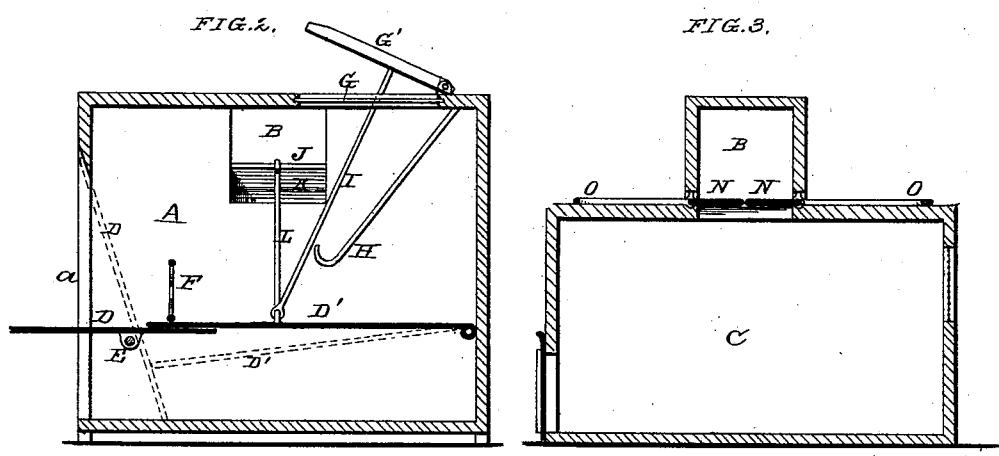
ATTEST:
Geo. H. Knight
Chas J. Gooch
INVENTOR:
Jay Shrader
By Knight Bro.
Attys

UNITED STATES PATENT OFFICE.

JAY SHRADER, OF ST. LOUIS, MISSOURI.

IMPROVEMENT IN ANIMAL-TRAPS.

Specification forming part of Letters Patent No. 201,293, dated March 12, 1878; application filed October 24, 1877.

*To all whom it may concern:*

Be it known that I, JAY SHRADER, of the city of St. Louis and State of Missouri, have invented certain new and useful Improvements in Animal-Traps, of which the following is a full, clear, and exact description, reference being had to the accompanying drawings, forming part of this specification.

My improvement relates to that class of traps in which the entering animal resets the trap for another victim.

In the drawings, Figure 1 is a longitudinal section of the trap when set. Fig. 2 is a transverse section through the outer chamber of the trap when set, showing the position when the entrance is closed by dotted lines. Fig. 3 is a transverse section of the inner chamber.

The trap has two boxes, A and C, connected by a passage, B. The box A is open at one end, $a$, and across the opening or doorway $a$ extends a horizontal bar, E, upon which is hinged the tilting platform D, which forms the door of the trap when it is closed, and which, when the trap is open, extends beyond the doorway $a$, to give means for the entrance of the animal into the trap.

D' is a platform, whose inner end is hinged to the inner end of box A, and which extends forward to a point just within the bearing-bar E. Over the platform D, and in proximity to the bearing-bar E, is a fence, F, extending transversely across the box A, and of such height that the animal can readily climb or jump over it. Then the weight of the animal upon the outer end of platform D', which overlies the inner end of platform D, will carry these ends of the platform downward and tilt up the outer end of the platform D, so as to close the doorway, as shown in Fig. 2. In this position the upper part of platform D rests against the top of the box, and it forms a door, closing the trap; and the outer end of platform D' rests against the inner side of platform D below the level of the bearing-bar, so as to constitute a brace, holding platform D in this position.

At the rear of the top of the box A is a window, G, which gives light to that part of the box where the bait is supported upon a hook, H. G' is a shutter or cover to the window G, and when the trap is set for the entrance of an animal the shutter is raised by a rod, I, whose lower end is hinged to the middle part of the platform D', and whose upper ends pass through the top of box A, and against the under side of the shutter, so that when the platform D' is in its upper position the shutter is also raised.

In the passage-way (which communicates with the inside of box A) is a platform, J, tilting on a cross-rod, K, and the end of this platform next to the box A is connected to platform D' by a rod, L, so that this end of the platform J rises and falls with that part of platform D'.

In the passage-way B, beyond the platform J, is a lifting gate, M, hinged at $m$, and made of open-work, of the construction very common in animal-traps, to allow the passage of the animal in one direction and prevent its return. Just beyond the gate M is a drop-platform, consisting of one or two hinged doors, N N, which gives way and allows the animal to descend into the receiving-box C beneath. These trap-doors have counter-balances O O, which restore them to their horizontal position after the descent of the animal.

The passage-way B is made so small that the animal cannot readily turn in it, so that when it once enters the passage it will follow it toward the end, where there is a pane of glass, P, to lure it on.

When the animal reaches the inner end of the platform J, next the gate M, that end descends by the weight of the animal and lifts up the other end, and with it the platform D', and places these parts in the position shown in Fig. 2, ready set for the entrance of another animal.

If a number of animals enter the trap at once, the platform-door D will be closed, so that there will be no escape from box A, and the platform-door D will not be opened until the last animal has reached the farther end of the platform J, because the weight of a single animal upon platform D' would prevent the tilting of the platform J so as to open the door D and reset the trap.

I am aware of Patent No. 179,940, granted to John H. Morris, 18th July, 1876, in which tilting platforms and hinged gate to close the entrance to the trap are shown; but my device possesses the important advantage, among others, over his that while animals may, by creeping stealthily along in his trap, escape capture, in mine they are certain to be caught, as they necessarily have to climb or jump over the gate or fence F, and step or jump onto the ends of the platforms, their whole weight necessarily falling thereupon, and insuring their tilting and the consequent precipitation of the animals.

I claim as my invention—

1. The combination of box A with the hinged platforms D and D', bearing-bar E, and fence F, the platform D being hinged to the bar E, and forming the door of the trap, while the platform D' overlies D, to insure the tilting of both platforms on the animal jumping over the fence F, substantially as described.

2. The combination, with the box A, platforms D and D', and bearing-bar E, of the tilting platform J and rod L in passage B, substantially as set forth.

3. The combination of box A, hinged platforms D D', rod I, window G, and shutter or cover G', substantially as set forth.

4. The combination of the boxes A C, passage-way B, hinged platforms D D', connecting-rod L, tilting platform J, gate M, and trip or trips N O, substantially as set forth.

JAY SHRADER.

Witnesses:
 SAML. KNIGHT,
 GEO. H. KNIGHT.